Oct. 21, 1941.　　　　J. PATZELT　　　　2,259,581
CASH REGISTER
Filed Oct. 22, 1938　　　　6 Sheets-Sheet 1

Julius Patzelt
Inventor

By Kearl Beust
His Attorney

Oct. 21, 1941.    J. PATZELT    2,259,581
CASH REGISTER
Filed Oct. 22, 1938    6 Sheets-Sheet 3

Julius Patzelt
Inventor

By Carl Benst
His Attorney

Oct. 21, 1941.                J. PATZELT                2,259,581
                            CASH REGISTER
                         Filed Oct. 22, 1938           6 Sheets-Sheet 4

Julius Patzelt
Inventor

By  Yearl Beust
His Attorney

Oct. 21, 1941.  J. PATZELT  2,259,581
CASH REGISTER
Filed Oct. 22, 1938  6 Sheets-Sheet 5

Julius Patzelt
Inventor

By Cecil Beust
His Attorney

Oct. 21, 1941.    J. PATZELT    2,259,581
CASH REGISTER
Filed Oct. 22, 1938    6 Sheets-Sheet 6

Julius Patzelt
Inventor
By Karl Berist
His Attorney

Patented Oct. 21, 1941

2,259,581

UNITED STATES PATENT OFFICE 2,259,581

CASH REGISTER

Julius Patzelt, Berlin, Germany, assignor to The National Cash Register Company, Dayton, Ohio, a corporation of Maryland Application October 22, 1938, Serial No. 236,507
In Germany November 9, 1937

14 Claims. (Cl. 235—6)

This invention relates to cash registers or accounting machines of the type illustrated and described in United States Letters Patent granted to Ernest Breitling and Hans Schwenk, No. 2,101,636, on December 7, 1937, and in application for United States Letters Patent of Ernest Breitling, Georg Topel, and Otto Philipp, Serial No. 238,546, filed November 3, 1938; and particularly to a novel totalizer selecting mechanism and control means therefor.

The above-mentioned patent relates to a cash register or accounting machine having at least one totalizer row comprising a number of special totalizers, and a multiple-item totalizer, in which row, in taking the total from the multiple-item totalizer, the multiple-item total is transferred, during one and the same machine operation, from the multiple-item totalizer to one of the special totalizers; for instance, a transaction totalizer, located in the same row.

To this end, in the device according to said patent, the shifting drum, for the totalizer row comprising the multiple-item totalizer and a number of special totalizers, is connected over a differential gearing to the differential device of the special key bank associated with said totalizer row, and to the mode of operation lever which, only if moved into multiple-item total position, causes the shifting drum to be rotated. Due to the said lever being automatically restored during the multiple-item total taking machine operation, said rotation of the drum is reversed. The cam groove of the shifting drum is so shaped that when the mode of operation lever is moved into the multiple-item total position, the multiple-item totalizer is always alined with the amount differential devices. As a consequence, with the mode of operation lever set to multiple-item total position, the guide roller of the totalizer row is moved into a portion parallel to the amount differential planes, independently of the depressed special key, and then, upon restoring the mode of operation lever to add position, is moved into a screw-shaped portion of the cam groove of the shifting drum, according to the special key depressed each time.

Therefore, the object of the present invention is to enable the totalizer row including the multiple-item totalizer to move said shifting drum cam to select a special totalizer without necessitating the provision of a mode of operation lever.

Another object is to provide means whereby, during the time the items of a multiple-item transaction are entered and during a portion of the multiple-item total taking machine operation, the shifting drum, for the row containing the multiple-item totalizer and the special totalizers, is disconnected from the differential device associated with said row, and said drum is set exclusively by means of a special drive.

In the device according to the above-mentioned patent, the setting of the special differential device is always transferred to the shifting drum, whereas, according to the present invention, such transferring takes place only when the shifting drum is to be adjusted according to the setting of the special differential device. Disconnecting the shifting drum and the special differential device may be effected, for instance, by a toggle joint in the gearing between the shifting drum and the special differential device, one shank of said toggle joint being adapted to be rigidly connected to the shifting drum or a part of its gearing while items of a multiple-item transaction are being entered and while the item total is being taken.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Keyboard

The keyboard (Fig. 11) comprises amount keys 10, one bank comprising article keys 11, 12 each selecting a totalizer, one bank of insertable clerk keys 13, and a transaction key bank 14–18. Each of the keys 15, 16, 17, "Received on account," "Charge," and "Paid out" respectively, has allotted thereto a totalizer in the transaction totalizer row. No key is provided for "Cash" sales, but a "Cash" totalizer is provided within the transaction totalizer row, which is automatically selected by a fixed stop 19, as will be described hereinafter, each time a "Cash" sale is to be entered. To clear the "Cash" totalizer, the latter is selected upon depressing key 14.

Figures 11, 12:
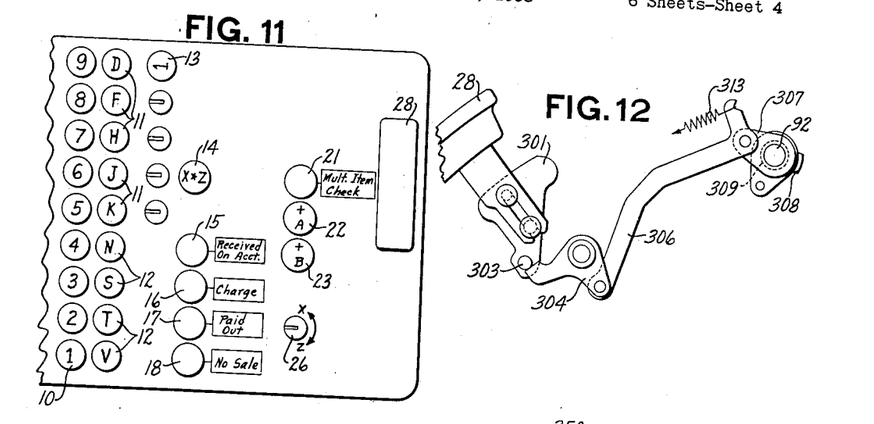
Fig. 11 is a diagrammatic view of a portion of the machine keyboard.
Fig. 12 shows part of the machine release mechanism.

To enter multiple-item transactions, one of the keys 21, 22, 23 is depressed, under control of which a multiple-item totalizer in the transaction totalizer row is selected in order to accumulate on it the items of such transactions and to cause, upon clearing said totalizer, the print of the item total to be paid by the customer. Besides engaging the multiple-item totalizer, key 21 causes the issuance of an itemized check, whereas the keys 22, 23 control printing of slips inserted into the machine. Depressing key 22 for multiple-item entries causes slips to be imprinted upon, said slips having each item of a multiple-item transaction written thereon (however, in multiple-item total taking no slip is imprinted), and depressing key 23 causes a slip to be printed only in connection with multiple-item total taking.

The multiple-item keys 21, 22, or 23, and the transaction keys 14 to 18, which are depressed for entering the first item of a multiple-item transaction, remain depressed until all the items of the transaction are entered and a total thereof is taken.

This bank is also provided with a lock 26 which, upon insertion of a certain key and turning said key to the left, conditions the machine for "Reading" or "Sub-total" (X) operations involving a transaction totalizer, whereas insertion of another key and turning said key to the right conditions the machine for "Resetting" or "Total taking" (Z) operations of said transaction totalizers. Neither of these keys need be inserted for a multiple-item total taking operation.

The machine is released for operation upon depressing a release or motor key 28.

Amount differentials

Associated with each amount bank of keys 10 is a differential mechanism similar to that shown in the above-mentioned Patent No. 2,101,636 and such mechanism will be but briefly described herein.

An actuator 31 (Fig. 7) is mounted on a shaft 30 and is connected to a main differential member 32 and a setting member 34 by a coupling pawl 33. The setting member 34 is connected by a beam 35 and a link 36 to mechanism, not shown herein, to set indicating and printing means.

Figures 7, 8, 9, 10:
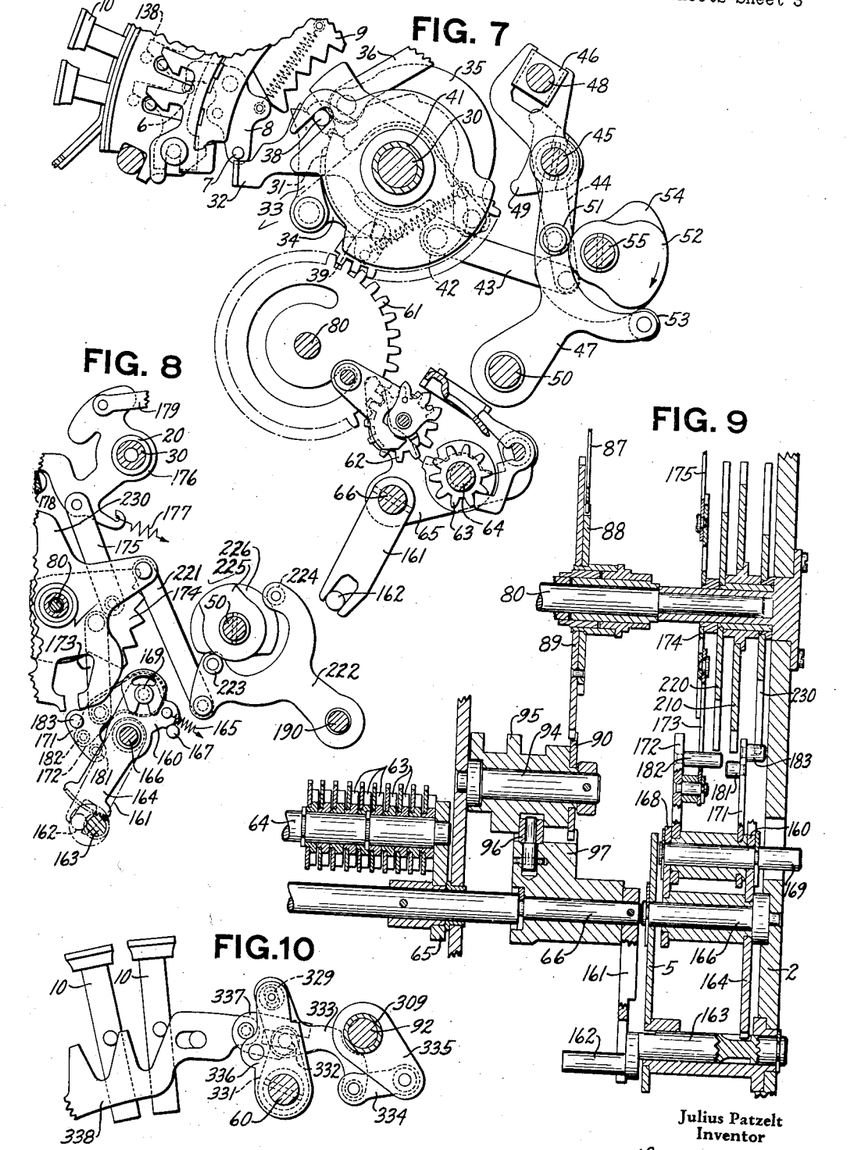
Fig. 7 shows an amount differential, a totalizer line, and part of an amount key bank.
Fig. 8 shows a part of the totalizer engaging mechanism.
Fig. 9 is a fragmentary sectional view of a part of the totalizer selecting, shifting, and engaging means.
Fig. 10 shows the means for controlling the shaft 60 by the amount keys.

The differential member 32 associated with each amount bank of keys drives a gear 61, supported by a shaft 80, which gear meshes with a gear 62 with which selected totalizer wheels 63 are engaged. These totalizer wheels are denominationally interspersed on a shaft 64.

All amount actuators 31 are secured to a sleeve 41 on the shaft 30. The actuator on each end of said sleeve 41 has an arm 42 connected to a link 43 also connected to an arm 44 supported by a rod 45 and guided on blocks 46 rockable on a shaft 48. The rod 45 is supported by two levers 47 pivoted on a shaft 50. The levers 47 carry rollers 51 and 53 cooperating with cams 52 and 54 respectively, secured to a drive shaft 55 which receives one clockwise rotation during each machine operation.

During each machine operation, the cams 52 and 54 rotate the levers 47 first counter-clockwise about the shaft 50 and then back to normal. The counter-clockwise movement of the levers 47 carries the rod 45 towards the shaft 30, which rocks the arms 44 and blocks 46 clockwise about the shaft 48, whereupon the links 43 rock the arms 42, sleeve 41, and actuators 31 clockwise until the differential member 32 is stopped by striking the stem of the depressed key 10. At this time, due to the continued movement of the actuator, a pin 38 of the coupling pawl is moved outwardly in a slot of the member 32, thus disengaging said member 32, the pawl 33, and setting member 34 from the actuator 31. A nose on the pawl 33 now engages a notch in a stationary plate 9, and the actuator 31, by passing the nose of the pawl 33, locks the pawl 33 and members 32 and 34 in their set positions.

Now a cam 49, pivoted on rod 45, contacts and moves the beam 35 to operate the link 36 to set the indicators and printers, not shown, according to the value of the key depressed.

Upon return of the levers 47 to normal position, the rod 45 and arms 44 are returned and the links 43 restore the actuators 31 to their normal positions, whereupon said actuators strike pins 39 in the setting members 34, thus returning the differential members 32, the pawls 33, and the members 34 to their normal positions.

Figure 16:
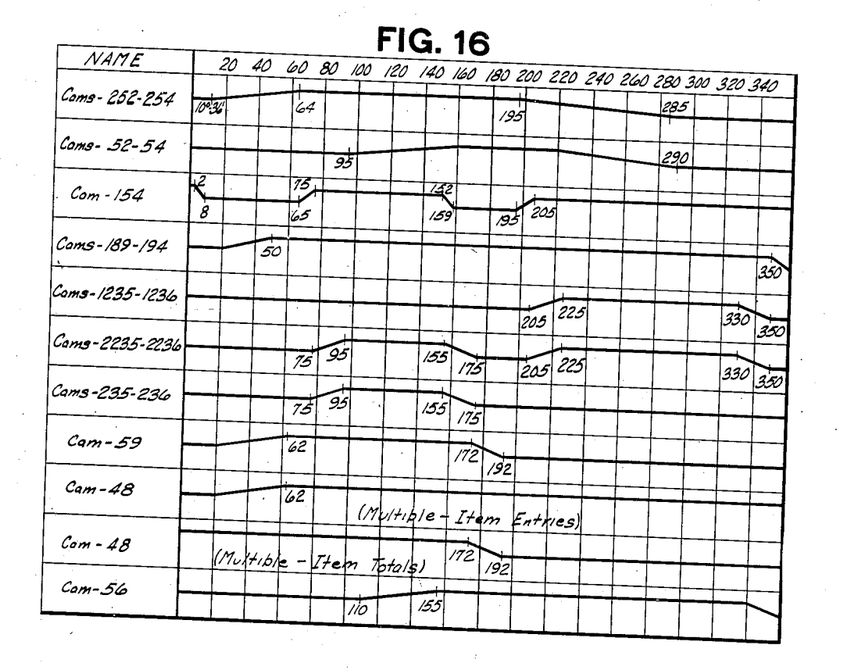
Fig. 16 is a time chart of the cams of the machine.

During this return movement of the differential members 32, the gears 61 and 62, having been set differentially according to the value of the depressed keys, are returned home and the gears 62 add (see time chart Fig. 16), upon the now engaged totalizer wheels 63, the amounts commensurate with the values of said depressed keys. The means for engaging the totalizer wheels 63 with the gears 62 will be described later.

When there is no amount key depressed in a bank, a zero stop pawl 8 of that bank, by means of a pin 7 thereon, retains the differential member 32 and associated differential parts in their normal positions. Depression of an amount key 10 operates a slide 138, whereupon a pin 6 on slide 138 rocks the pawl 8 and moves the pin 7 out of the path of the differential member 32.

Transaction differential

The transaction key bank has associated with it a differential device (Fig. 1) substantially like the amount differential above described except that the differential member has no gear teeth.

Figure 1:
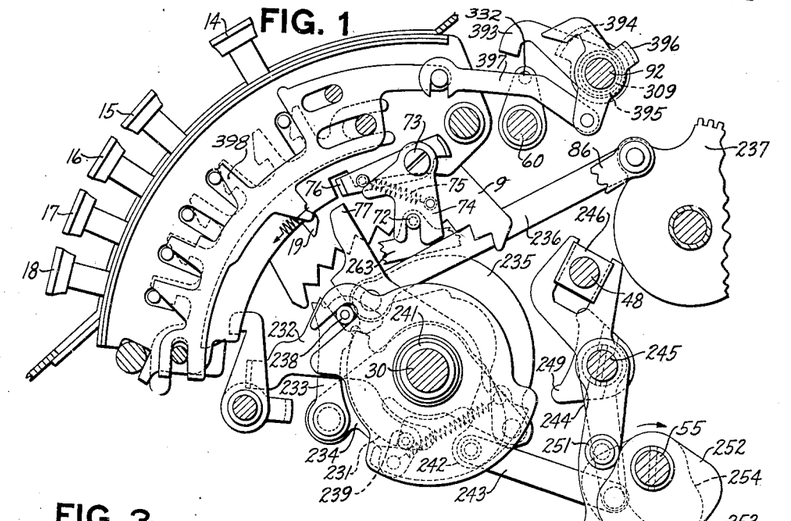
Fig. 1 is a side view of the transaction key bank and the associated special differential device.

Parts similar to those of the amount differential are given the same reference numbers, increased by 200. This transaction differential includes an actuator 231 mounted on the shaft 30, a main differential member 232, a coupling pawl 233, and a setting member 234. The setting member 234 is connected by a curved lever or beam 235 and a link 236 to a gear segment 237 which adjusts the appropriate indicating means and type wheels (not shown).

The transaction actuator 231 is secured to a sleeve 241 rotatable about the shaft 30. The actuator 231 has an arm 242 connected to a driving link 243 whereby said actuator is first rocked in clockwise direction by 90 degrees, and then restored to normal.

The transaction link 243 (Fig. 1) is connected to an arm 244 supported by a rod 245 in axial alignment with the rod 45 associated with the amount differentials. The arm 244 is guided by a block 246 rockable on the shaft 48. The rod 245 is supported by two levers 247 (Figs. 1 and 2) pivoted on the shaft 50. The levers 247 carry rollers 251 and 253 which cooperate with cams 252 and 254 respectively secured to the drive shaft 55, which, as previously stated, receives one clockwise rotation during each machine operation. The cams are so timed as to become operative prior to operation of the cams 52 and 54 (see Fig. 16).

Figure 2:
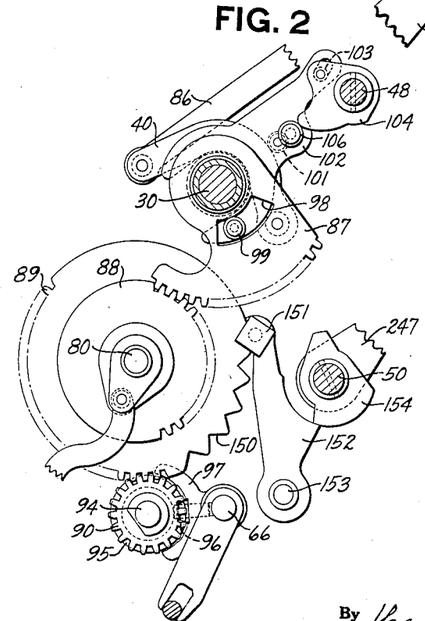
Fig. 2 is a side view of the operative gearing between the special differential device and the shifting drum of the totalizer row.

Therefore, during each machine operation the cams 252 and 254 rotate the levers 247 first counter-clockwise about the shaft 50 and then back to normal. The counter-clockwise movement of the levers 247 carries the rod 245 towards the shaft 30, which rocks the arm 244 and block 246 clockwise about the shaft 48, whereupon the link 243 rocks the arm 242, sleeve 241, and actuator 231 clockwise. Upon return of the levers 247 to normal, the rod 245 and arm 244 are returned and the link 243 restores the actuator 231 to normal position.

Upon operating the above differential mechanism after depressing a key of the transaction key bank, the main differential member 232, coupling pawl 233, and setting member 234 are carried along while the actuator 231 is rotated clockwise, until the main differential member 232 is stopped by the foot of the depressed key. Due to the fact that the actuator 231 continues moving and the main differential member 232 is stopped, a pin 238 of the coupling pawl 233 is guided outwardly in an inclined slot of the main differential member 232, whereby the differential member 232, coupling pawl 233, and setting member 234 are disconnected from the actuator 231. At this time, a pointed extension of the coupling pawl 233 enters a corresponding notch of a locking plate 9 fast on the key frame, and the actuator 231 moves underneath a foot of the coupling pawl 233, thereby holding the latter, the main differential member 232, and the setting member 234 connected to it in the position set.

Now the curved lever or beam 235 linked to the setting member 234 is urged towards the periphery of a hub by a cam 249. Thus the link 236 sets the gear segment 237 and its connected indicator according to the key depressed.

The actuator 231, on its return movement, strikes a pin 239 of the setting member 234 and restores the differential member 232, the pawl 233, and the setting member 234 to home positions while gear segment 237 remains in the position set until the next machine operation.

If no key 14 to 18 (Figs. 1 and 10) is depressed, the main differential member 232 is free to rotate in clockwise direction until it is stopped by a fixed stop 19. Such adjustment of the main differential member 232 occurs when entering "Cash" transactions.

By turning the lock 26 (Figs. 11 and 13) the machine is conditioned for total or sub-total taking operations from the transaction totalizers, and by means of a link 263 (Figs. 1 and 13) having a pin 72 engaging a slot of an arm 74 pivoted on a solid screw 73, rotates said arm 74 counter-clockwise and by means of spring 75, moves a stop pawl 76 into the path of extension 77. Thereafter, upon operation of the machine, the stop 76 arrests the main differential member 232 in zero position, provided no key 14 to 18 is depressed in the transaction key bank. If, however, after the machine is conditioned for total or sub-total taking, one of the keys 14 to 17 is depressed, the stop pawl 76 is restored to ineffective position against the action of spring 75, by means of key detents 206 or 290 (Fig. 13), which are moved upwardly upon depressing one of said keys, so that the main differential member 232 can be adjusted by the foot of the depressed key 14 to 17 or by the stop 19. In order to restore the zero stop pawl 76, the detents 206 and 290 are provided with shoulders 206a and 290a, respectively, which coact with a flange 1258 on the zero stop pawl 76, when either detent is moved upwardly by the depression of a key 14 to 17, to restore the zero stop pawl to its normal position.

The link 263 (Fig. 13) is moved to operate the stop 76 by a gear 269 on the lock barrel 26 meshing with teeth 268 of a slide 267 which has a pin 266 engaging a cam slot 265 of a lever 264 pivoted to the bar 263.

Totalizers

While the machine shown in the above-mentioned pending application Serial No. 238,546 has four rows of interspersed totalizers, only a part of one row is shown in the present case (Figs. 7 and 9).

The totalizer wheels 63 are denominationally mounted on the shaft 64 supported by two arms 65 (only one being shown) which are secured to a rock-shaft 66. The shaft 66 is adapted to be axially shifted, by means later described, to bring the wheels 63 of the selected totalizer opposite the differential gears 62 with which the wheels 63 are engaged to have amounts added thereto and to be cleared thereby.

Totalizer selection

The selection of the transaction totalizers is effected by the transaction differential mechanism described above. Thus, depression of a transaction key 15 to 17, when entering single-item transactions, controls the differential to select the corresponding transaction totalizer. When no key 15 to 18 is depressed, the transaction differential is arrested by the stop 19, which selects the "Cash" totalizer. During total-taking operations, the "Cash" totalizer is selected by key 14.

The selection of the multiple-item totalizer for receiving multiple items is effected by the same transaction differential, when a multiple-item key 21 to 23 is depressed. In entering the items of a multiple-item transaction, it is necessary to depress an amount key, a transaction key (except for cash transactions), and a multiple-item key 21 to 23. At the end of each multiple-item entry operation, only the amount keys are released. When taking a total of a multiple-item transaction, no amount key is depressed, and the simple depression of the motor bar 28 causes the total to be taken from the multiple-item totalizer and to be transferred to the transaction totalizer corresponding to the transaction key which is depressed.

For taking a total of a transaction totalizer, it is necessary first to condition the machine for total-taking by turning lock 26.

The gear segment 237 (Fig. 1), set by the transaction differential device allotted to the transaction keys 14 to 18, is connected by a link 86 (Figs. 1 and 2) to one end of a curved lever or beam 40 (Fig. 2), the other end of which is linked to a setting segment 87. The outward edge of the lever or beam 40 is engaged by a guide roller 101 of slide 102 guided at either end on the shaft 30 and pin 103 of a cam disk 104 fast on the shaft 48. Another guide roller 106 of a slide 102 engages the cam disk 104. Normally, the shaft 48, which, in a manner described hereinafter, can be rotated under control of the multiple-item keys 21 to 23, is positioned as shown in Fig. 2, in which the cam disk 104 acts upon the guide roller 106 of slide 102, so that its other roller 101 keeps the lever or beam 40 in contact with the periphery of a hub. With the cam disk 104 positioned so, the setting segment 87 is adjusted by the setting member 234. The setting segment 87 (Figs. 2 and 9) is in mesh with a gear wheel 88 rotatable on a shaft 80, said gear wheel being rigidly connected to a wheel 89 of greater diameter also mounted on shaft 80. Wheel 89 meshes with wheel 90 rigidly connected to a cam groove roller 95 rotatably but unshiftably mounted on a stationary stud 94. With the cam disk 104 positioned as shown in Fig. 2, cam groove roller 95 is positioned according to the depressed transaction key 14 to 18 upon setting the transaction differential device.

Figure 3:
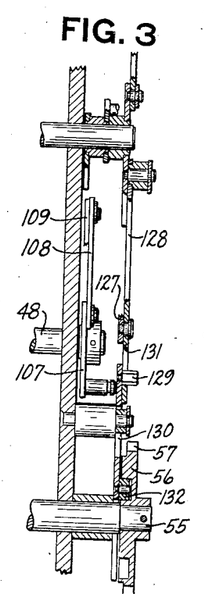
Fig. 3 is a front view of a section along line 3—3 of Fig. 4.
Figure 18:
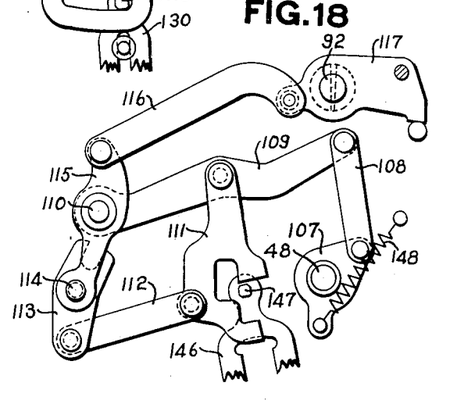

Secured to the right-hand end of the shaft 48 is a lever 107 (Figs. 3, 4, and 18) connected by a link 108 to lever 109 pivoted on the stationary stud 110. About midways, lever 109 has attached thereto a coupling lever 111 which, by a link 112, is connected to a two-armed lever 113. The latter is pivoted on stud 114 of a two-armed lever 115 pivoted on the stud 110, the lever 115 being connected by a link 116 to an arm 117 pinned to a shaft 92. The slotted upper end of the two-armed lever 113 embraces pin 118 of an intermediate lever 119 pivoted on the stud 110 and having a slot to embrace a pin of a key detent 120. The latter is shiftably attached to the control key bank and has bevelled surfaces so arranged that, upon depressing a multiple-item key 21 to 23, said detent is moved upwards.

Figures 4, 5, 6:
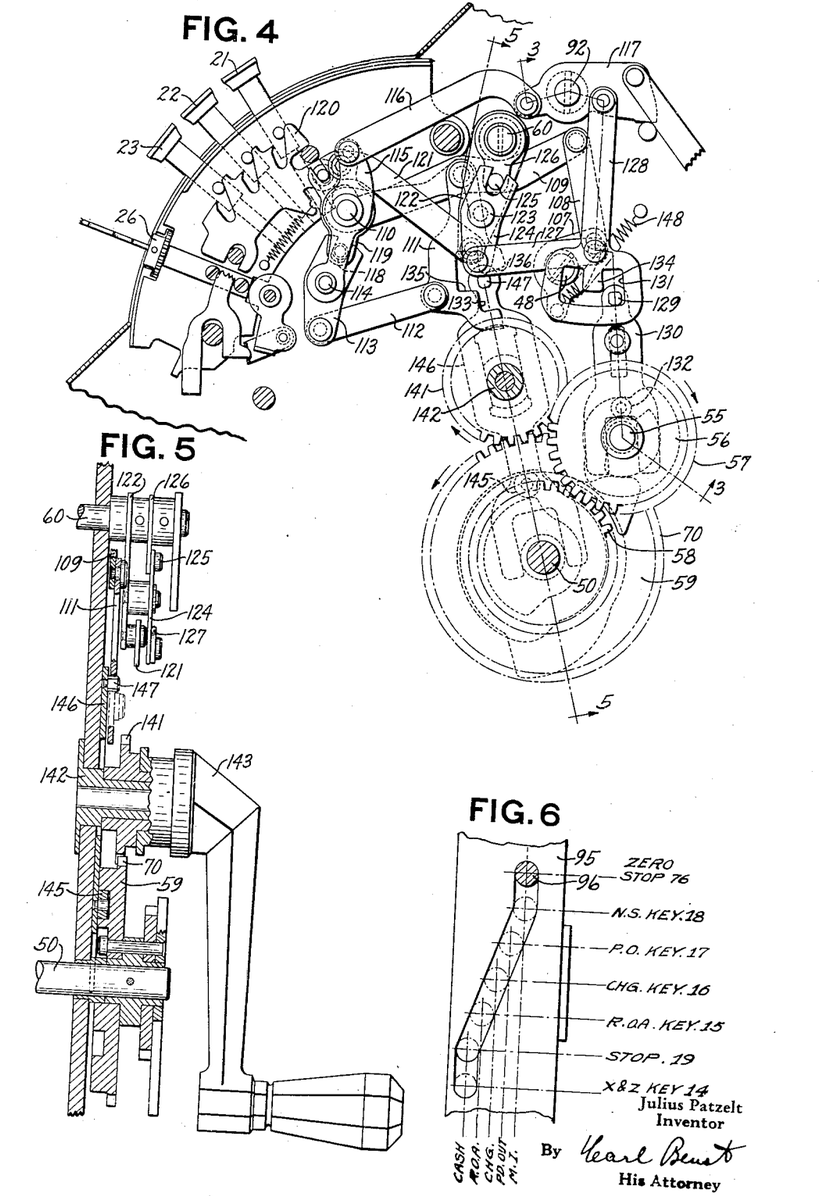
Fig. 4 is a side view of the control key bank and the control device for entering single amounts and item totals.
Fig. 5 is a front view of a section along line 5—5 of Fig. 4.
Fig. 6 is an evolution of the shifting drum of the totalizer row shown in diagrammatic form.

Moreover, the intermediate lever 119 is connected by a link 121 to an arm 122 rotatably mounted on a shaft 60. A pin 123 of the arm 122 carries a two-armed lever 124, the forked upper end of said lever embracing a pin 125 of an arm 126 fast on the shaft 60.

The shaft 60 carries a tube having secured thereto two arms 331 (only one of which is shown in Fig. 10), which arms 331 support a rod 332. The rod 332 carries a two-armed lever 333, the lower arm being connected by a link 334 to an arm 335 which, upon depression of the motor bar 28 (Fig. 12), is moved clockwise by the following means.

The motor bar 28, through a slide 301 and its pin 303, rocks a bell-crank 304 counter-clockwise, which, by means of a link 306, rocks an arm 307 and a bail 308 to which it is connected, in a clockwise direction. The bail 308 is connected to the sleeve 309, and therefore, causes the abovementioned clockwise movement (Fig. 10) of the arm 335. When the operator releases the depressed motor bar 28, a spring 313 (Fig. 12) returns the above-mentioned train of mechanism, from the key 28 to the arm 335, to their normal positions.

The rod 332 carries means associated with all of the amount banks of keys 10, but, in the present application, the means associated with one bank only will be described.

A slide 337 pivoted to a detent or bar 338 is guided by the rod 332. This bar 338 is moved to the right (Fig. 10) upon depression of any amount key in the associated key bank, whereupon the left end or wall of the slot in the slide 337 contacts the rod 332.

The upper arm of the lever 333 surrounds a pin 329 of an arm 336 fast to the shaft 60.

If no amount key is depressed, then upon depression of the motor bar 28 (Fig. 12), the lever 335 is rocked clockwise (Fig. 10) and the lever 333 is rocked about the pin 329 as the rod 332 moves to the left in the slot of the slide 337, and therefore the shaft 60 is not rocked.

However, when an amount key 10 is depressed, the slide 337 is moved to the right (Fig. 10) until the left wall of its slot contacts the rod 332, thus causing the lever 333 to pivot on said rod upon operation of the motor bar 28. Therefore the pin 329 now rocks the arm 336 and shaft 60 clockwise. In all other machine operations except "No sale," the shaft 60 occupies the position shown in Figs. 4 and 10.

As stated above, the arm 335 and associated parts return to home position immediately upon release of the motor bar 28; however, the shaft 60 is maintained in its rocked position by means to be described, until the machine operation is completed.

For a "No sale" operation, the shaft 60 must be rocked by depression of the motor bar 28 and therefore the rod 332 must be held upon depression of the "No sale" key 18. This is accomplished by a hook 393 (Fig. 1) in the following manner.

A bail 394, one arm of which rides on the shaft 92 and the other arm of which is secured to a tube 395, has a slot through which the hook 393 passes so as to be operated thereby. A bail 396 is also secured to the tube 395 and is connected by a link 397 to a key-operated slide 398 of the transaction key bank. This slide 398 has camming projections cooperating with the "Received on account" key 15, the "Paid out" key 17, and the "No sale" key 18. The camming projections cooperating with the keys 15 and 17 are so shaped that depression of either of said keys, through the link 397, bail 396, tube 395, and bail 394, rocks the hook 393 but a short distance, not far enough to engage the rod 332. However, the camming projection of the slide 398, associated with the key 18, causes the hook 393 to engage the rod 332 to prevent movement of the latter upon operation of the motor bar 28. Therefore, the shaft 60 is rocked clockwise upon operation of the motor bar 28, after depression of the "No sale" key 18.

Figure 17:
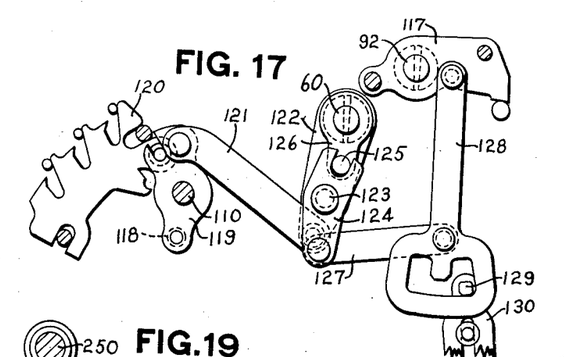
Figs. 17 and 18 are detail views of certain of the mechanisms shown in Fig. 4.

The lower arm of lever 124 (Figs. 4, 5, and 17) is connected by a link 127 to a link 128 which is attached to arm 117 fast on shaft 92. A U- shaped recess 131 of this link 128 is engaged by a pin 129 of a slide 130, which is guided on the shaft 55 and about a stationary stud, and has a guide roller 132 to engage the cam groove of a disk 56 fast on shaft 55. Disk 56 has teeth 57 constantly meshing with a gear 58 of the same diameter. The gear 58 is fast on the main drive shaft 50 and rigidly connected to a cam groove disk 59 (Fig. 5) having teeth 70 meshing with a gear 141 of half the diameter, which is rotatably mounted on the stationary sleeve 142 and is rotated twice in clockwise direction (Fig. 4) by means of the hand crank 143 when the machine is manually operated. This actuating movement is transferred to the shafts 50 and 55 as a single revolution. The cam groove of the cam disk 59 is engaged by a roller 145 of a slide 146 guided on shaft 50 and sleeve 142 and having a pin 147 normally extending into a recess 133 in the coupling lever 111.

If no amount key and no multiple-item key are depressed, the parts of the mechanism described are positioned as shown in Fig. 4. If, now, the machine is released for sub-total taking or clearing one of the transaction totalizers, the two slides 130 and 146 move idly, as their pins 129 and 147 move idly to and fro within the recesses 131 and 133 of the coupling rod 128 and lever 111 respectively.

If the amount of a single item transaction is set up on the amount keys 10, shaft 60, upon depression of the motor key 28, is rotated clockwise. At this time, arm 126, being fast on shaft 60, rocks the lever 124 about stud 123, as arm 122 remains stationary due to the fact that no multiple-item key is depressed for single-item transaction entries. Through link 127, the rotation of the lever 124 is transferred to the coupling rod 128, which thereby is moved to the right until a projection 134 thereof is moved above the pin 129 of the slide 130. As the coupling lever 111 is not displaced, the slide 146 moves idly. Slide 130, however, moving upwardly, carries along the coupling rod 128 after one-third of the machine operation and restores it to normal near the end of the machine operation. Due to this, shaft 92 is rotated counter-clockwise and is returned again. Through the link 116, this movement is transferred to the lever 115 having the stud 114, rocking the lever 113 about the held pin 118, whereby, through the link 112, the coupling lever 111 is pulled to the left. This displacement, however, exerts no practical effects, as pin 147 of slide 146 does not come into contact with the coupling lever 111 even in this new position.

If, for the purpose of registering an item of a multiple-item transaction, a multiple-item key, as well as an amount key, is depressed, the parts are displaced through the shaft 60 in accordance with the depressed amount keys and the depressed multiple-item key.

Upon depression of a multiple-item key, the lever 113 is rocked, by the key detent 120 and the angular lever 119, in counter-clockwise direction about stud 114, whereby the coupling lever 111 is moved to the right until a step 135 of its recess 133 is moved underneath the pin 147 of slide 146. Due to the depression of an amount key, the projection 134 of the coupling rod 128 has been moved over the pin 129 of the slide 130 by the shaft 60. The movement of the key detent 120 also, through lever 119 and link 121, causes the arm 122 to rock in counter-clockwise direction. At this time, the stud 123 of the arm 122 rocks the lever 124 in counter-clockwise direction about pin 125 and, through the link 127, moves the coupling rod 128 another step to the right, so that the left shank of the U-shaped recess 131 is moved into the path of pin 129. Thus, in such machine operations, that is, in entering items of multiple-item transactions, the slide 130 moves idly and the shaft 92 will not be rotated.

Shortly after the beginning of the machine operation, the slide 146 is moved down by the cam disk 59, the pin 147 carrying along the coupling lever 111, and, by means of the lever 109, link 108, and lever 107, rotates the shaft 48 in clockwise direction against the action of a spring 148. By this clockwise rotation of the shaft 48, the cam of the disk 104 (Fig. 2) fast on shaft 48 is removed from the roller 106. At the same time, the pin 103 of disk 104 pulls the slide 102 upwards. A pin 99 of slide 102, extending into an arcuate recess 98 of the setting segment 87, strikes at this time the right-hand end of said recess 98 and moves the setting segment 87 out of the position into which it was brought in the previous machine operation, and moves it in counter-clockwise direction into the first or "No sale" key position.

Due to this, the device about to be described moves the totalizer row comprising the multiple-item and the transaction totalizers into the position corresponding to key 18, in which position the adding wheels of the multiple-item totalizer are aligned with the amount differential members. From this it results that with a multiple-item key and an amount key, depressed, the multiple-item totalizer is automatically selected.

This selection is effected at the beginning of the first multiple-item machine operation and is maintained while the items of a multiple-item transaction are entered, as at this time, due to the clockwise movement of the lever 107 by the slide 146, the spring 148 stands past a dead center line drawn from the center of shaft 48 through the center of the stud to which the spring 148 is attached. During the entering of subsequent items of the respective multiple-item transaction, the movement of the slide 146 does not affect the shaft 48, so that the amounts of the items of a multiple-item transaction are entered into the multiple-item totalizer.

Also in taking the multiple-item total, the multiple-item totalizer, during the first third of the machine operation—that is, for the purposes of resetting—is maintained selected due to the described setting of shaft 48. In multiple-item total taking operations, no amount key is depressed, and therefore the previously depressed multiple-item key maintains the coupling link 128 in its intermediate position where cam 56, through pitman 130, can lower link 128 and therefore rock shaft 92. Therefore, after the first third of this machine operation, shaft 92 is rotated counter-clockwise in the manner described, and due to this, by means of the link 116, lever 115, pin 114, lever 113, and link 112, the coupling lever 111 is pulled to the left, whereby its edge 136 is moved above pin 147 which at this time is in its lower position. Now, when the cam groove disk 59 moves slide 146 up again, the shaft 48 is restored to home position against the action of the spring 148, which is now moved back past the dead center into its normal position. In home position, shaft 48 is held again by spring 148. While shaft 48 is returned, its cam disk 104 (Fig. 2) moves the slide 102 down again, the roller 101 of said slide moving the lever or beam 40 again into contact with the hub. As the appropriate setting segment 237, which was set by a minimum movement device 235—236 according to the depressed key 15 to 17, or the stop 19, depending upon the transaction to be recorded, is held in this position, the setting segment 87, by the roller 101 bearing upon the lever or beam 40, is rocked in clockwise direction a corresponding distance. At this time the transaction totalizer row is shifted by means of the cam roll 95, so that the respective transaction totalizer is alined with the amount differentials and brought into engagement with the same to accumulate the total taken from the multiple-item totalizer.

To aline the cam groove roll 95 after adjustment, and to hold it in the position set, the toothed wheel 89 has locking teeth 150 for a beam 151 to engage therein, said beam being carried by two arms 152 mounted on shaft 153. During the setting of wheel 89, said locking beam, under the tension of a minor spring (not shown), engages the locking teeth 150 so that it may yield. After the wheel 89 is finally adjusted, beam 151 is locked within the respective notch by means of cam disk 154 fast on the main drive shaft 50 and shaped suitably, and thus the cam groove roll 95 is held in the position set while the totalizers are operated.

Roll 95 (Figs. 2, 6, and 9) has a cam groove engaged by a guide roller 96. The latter is fast on a shift fork 97 which is rotatably but unshiftably mounted on the transaction totalizer rock shaft 66. This fork is secured against rotation by its arms engaging, from either side, the periphery of the appropriate cam roll 95. Upon rotation of the cam roll 95, the totalizer rock shaft 66 is shifted and can be rocked out by means of an adding wheel engaging and disengaging device to be later described.

The cam groove of roll 95 (shown diagrammatically in Fig. 6) is so shaped that, if the transaction differential device is adjusted by the transaction key 18 (No sale) or the stop pawl 76, the adding wheels of the multiple-item totalizer are alined with the amount differentials. The totalizer row is so positioned also by the segment 87 when restored by the slide 102.

*Totalizer engaging means*

The totalizer engaging means will be briefly described. Secured to the shaft 66 (Figs. 8 and 9) is a lever 161 forked to engage a stud 162 eccentrically secured to a shaft 163 supported by the machine frame 2 and a partition 5. The shaft 163 has teeth meshing with a gear segment 164 pivoted on a stud 166 supported in axial alinement with the shaft 66 by the frame 2. An integral arm 160 of the segment 164 is normally held against a stud 167 by a spring 165. The segment 164 has a hub to which is secured an arm 168, and the latter and the arm 160 carry a shaft 169. Secured to a hub on the shaft 169 are arms 171 and 172. A link 173 connects the arm 172 to a locking segment 174 pivoted on the shaft 80, and a link 175 connects the segment 174 to a lever 176 pivoted on a sleeve 20 which supports the shaft 30. A spring 177 normally holds the lever 176 against a stud 178, thus holding the arms 171 and 172 in the position shown in Fig. 8.

The arm 171 carries pins 181 and 183 (Figs. 8 and 9) cooperating with adding and resetting coupling disks 210 and 230 respectively, and the arm 172 has a pin 182 cooperating with a reading disk 220.

Secured to the shaft 50 is a pair of cams 225 and 226 cooperating with rollers 223 and 224 carried by a lever 222 pivoted on a stud 190. A link 221 connects the disk 230 with the lever 222.

When the pin 183 is moved into cooperative relationship with the disk 230, by means later described, the disk 230 is rocked clockwise by the cams 225 and 226, the lever 222, and the link 221, whereupon, through the pin 183 and arms 171 and 169, the segment 164 is rocked counter-clockwise. Therefore, the shaft 163 and stud 162 rock the lever 161, shaft 66, and arm 65 counter-clockwise, thus engaging the totalizer wheels 63 with the actuating gears 62.

The cams 225 and 226 cause such engagement of the wheels 63 with the gears 62 on total taking time; that is, before the differential members 32 (Fig. 7) are moved clockwise, thus causing the engaged totalizer to be reset.

There is a pair of cams 1235 and 1236 (Fig. 14) substantially like the cams 225 and 226 for operating the adding disk 210 to engage the totalizer wheels 63 with the gears 62 on adding time when the pin 181 is moved into engagement with the disk 210.

Figure 14:
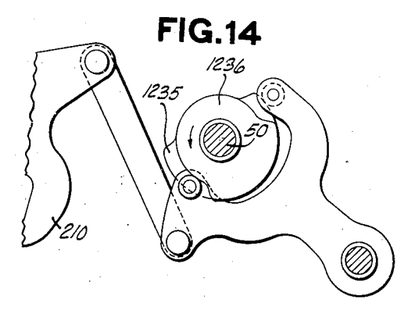
Fig. 14 is a detail view showing the engaging cams for engaging the selected totalizer with the actuators in "add" timing.

Another similar pair of cams 2235 and 2236 operates the reading disk 220 to engage the wheels 63 with the gears 62 on reading or subtotal time when the pin 182 is engaged with said disk 220.

A link 179 (Fig. 13) connects the lever 176 with a bar 185 which is connected to a lever 186 pivoted on a stud 187. A roller 188 on the lever 186 contacts a cam 189 driven by the shaft 55. A pin 191 connects the lever 186 with a lever 192 pivoted on the stud 187. This lever 192 has a roller 193 contacting a cam 194 driven by the shaft 55.

Figure 13:
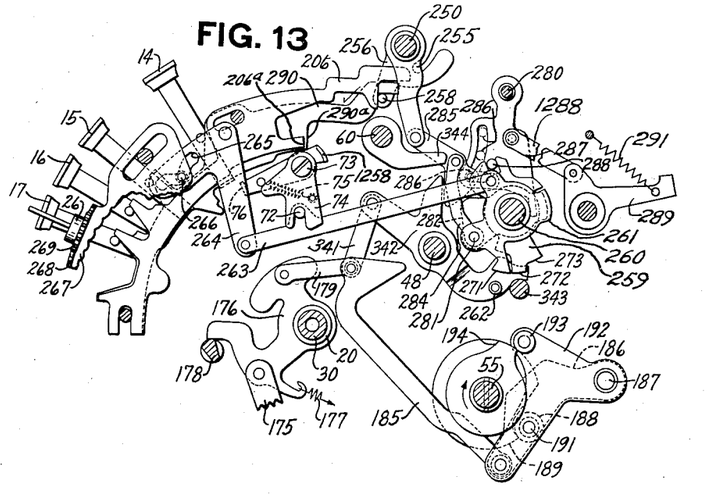
Fig. 13 shows the totalizer engaging coupling pin operating mechanism and controls therefor.

Connecting the bar 185 to a lever 342 pivoted on the shaft 48 is a link 341. The lever 342 normally contacts a rod 343 and the upper end of said lever is outside the path of a lever 344 secured to the shaft 60. This shaft 60, when rotated, moves lever 344 into the path of the lever 342 and therefore, when the cams 189 and 194 draw the bar 185 towards the right, the lever 342, being held by the lever 344, causes the bar 185, by means of the link 179, lever 176, link 175, and segment 174, to rock the arms 171 and 172, as above described, to effect engagement of the pin 181 with its associated disk 210.

During total taking shoulder 273 of a disk 359 on a shaft 260 cooperates with a pin 262 on the lever 342 to effect proper engagement of the pin 183 with the resetting disk 230.

The link 263 (Fig. 13) connects a disk 261 with a lever 264, and so the disk 261 is operated by the lock barrel 26 when the same is actuated to set the machine for a read or reset operation. When so operated, a stop surface 271 of the disk 261 is moved out of the path of the pin 262.

The disk 261 is connected by a bail and a rod 281 (Fig. 20) to a disk 282. A link 284 (Fig. 19) is pivoted to the rod 281 and to a link 285 connected to an arm 255 secured to an arm 256 carrying a pin 258 cooperating with the transaction detents 296 and 299. The arms 255 and 256 are pivoted on a shaft 259 and, upon depression of a key 14 to 17, said arms are rocked counter-clockwise, whereupon a pin 286 is moved freely in the horizontal part of a slot in a lever 287 pivoted on a rod 288. The lever 287 is normally held in the position shown by a spring 291 connected to a lever 289, which lever is connected to the lever 287 by a link 1288. The lever 287 has an extension at its lower end bearing against a hub on shaft 260 to determine its normal position.

Figure 19:
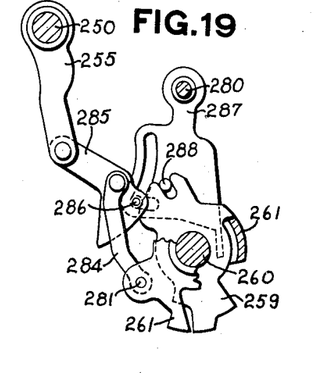
Figs. 19 and 20 are detail views of certain of the mechanisms shown in Fig. 13.
Figure 20:
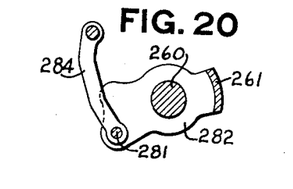

If the lock 26 is set to "Read" or "Reset," the disk 261 is rotated one or two steps by means above described, whereupon the link 284 rocks the link 285 to set the pin 286 into either its middle or its top position in the vertical part of the slot in the lever 287. Now, if a transaction key is depressed, the lever 287 is rocked counter-clockwise one or two steps, depending upon the position of the pin 286 in the slot of the lever 287, and, through a pin 288, the disk 259 is rocked to position its surface 272 or 273 opposite the pin 262 of the lever 342.

Therefore, when the bar 185 is pulled down, the lever 342 follows until the pin 262 contacts either the surface 272 or 273, and the remainder of the motion of bar 185 then rocks the arms 171 and 172 two or one steps. When rocked two steps, the pin 182 engages the disk 220 for a reading operation.

Figure 15:
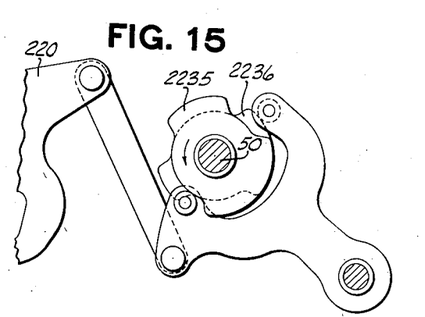
Fig. 15 is a detail view showing the engaging cams for engaging the selected totalizer with the actuators in "Read" timing.

To take a multiple-item total, the lock 26 is not operated and consequently the disk 259 remains in normal position (Fig. 13). Moreover, since there is no amount key 10 pressed at such time, the shaft 60 and lever 344 will not be rotated and the lever 342 is not locked. Therefore the full motion of the bar 185 is taken up by the lever 342 until the pin 262 contacts the surface 271 of the disk 261. This is about one-third of the motion of the lever 342, and so the remaining two-thirds of the motion of the bar 185 is transmitted to the arms 171 and 172, whereby the pin 182 is engaged with the "Read" or "Sub-total" disk 220, thus causing engagement of the wheels 63 of the multiple-item totalizer, with the gears 62 prior to the movement of the differential members 32 and disengagement therefrom after such movement is finished. The cam disks 2235 and 2236 (Fig. 15) are so shaped that, after the amount has been taken from the totalizer, the totalizer is temporarily disengaged from the differential members, until the totalizer group has been shifted to bring the transaction totalizer in line with the amount differential members, whereupon the cams again engage the transaction totalizer with the amount differential members. The engagement of the transaction totalizer with the differential members is effected by cams 2235 and 2236 prior to the return movement of said differential members and disengaged again after amount entering is completed.

Such reading operation is necessary for taking a multiple-item total, since the multiple-item totalizer must be reset and the total taken therefrom must be transferred to a selected transaction totalizer in the same row.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a plurality of transaction totalizers and a multiple-item totalizer arranged in a row; a set of actuators for said totalizers; means to control the actuators to enter items of a multiple-item transaction in said multiple-item totalizer; a plurality of transaction keys; a differential mechanism actuated under control of said transaction keys; connections operated by the differential mechanism for selecting a transaction totalizer to receive therein the amount of a single-item transaction; a multiple-item key; power-operated means operable during a machine operation; normally inactive means operated by the power-operated means to readjust said connections prior to the entry of the items of a multiple-item transaction for automatically selecting said multiple-item totalizer to receive said multiple item; and connections controlled by the multiple-item key to render the normally inactive means active.

2. In a machine of the class described, the combination of a plurality of transaction totalizers and a multiple-item totalizer arranged in a row; a set of actuators; means to control the actuators to enter items of a multiple-item transaction in said multiple-item totalizer; means to control the actuators to take the total of said items from the multiple-item totalizer; a plurality of transaction keys; a differential mechanism actuated under control of said keys; connections actuated by the differential mechanism for selecting a transaction totalizer to receive thereon the amount of a single-item transaction; a multiple-item key; power-operated means operable during a machine operation; means normally disconnected from the power-operated means and operable by the power-operated means when connected thereto to readjust said connections prior to the entry of the items of a multiple-item transaction for automatically selecting said multiple-item totalizer to receive said items; means actuated under control of the multiple-item key to connect the normally disconnected means to the power-operated means; and means to maintain said normally disconnected means connected with the power-operated means during a multiple-item total-taking operation to automatically restore the connections to the position in which the connections were adjusted by the differential mechanism to select a transaction totalizer under control of the operated transaction key to receive the total of the items taken from the multiple-item totalizer.

3. In a machine of the class described adapted to register single-item transactions and multiple-item transactions and to take the total of the items of a multiple-item transaction, the combination of a multiple-item totalizer and a plurality of transaction totalizers arranged in a row; a set of actuators therefor; means for shifting said row of totalizers relatively to said actuators; a plurality of manipulative devices; a differential mechanism controlled by said devices; means intermediate said differential mechanism and said shifting means to operate the latter under control of the differential mechanism during certain operations, said intermediate means including an adjustable member; an element coacting with the adjustable member to normally maintain the adjustable member in position to cause the shifting means to be operated by the differential mechanism; means connected to the element; and mechanism to actuate the means to thereby move the element out of its normal position to thereby operate the adjustable member for disconnecting the intermediate means from the differential mechanism and maintaining such disconnection during a plurality of certain other operations.

4. In a machine of the class described capable of receiving entries consisting of single items and multiple items and taking multiple-item totals, the combination of a multiple-item totalizer and a plurality of transaction totalizers arranged in a row; actuators therfor; means for shifting said row of totalizers relatively to the actuators; a plurality of manipulative devices; a differential mechanism controlled by the manipulative devices; connections actuated by the differential mechanism for controlling said shifting means, said connections including a loose connection to permit operation of the differential without actuating the shifting means; normally ineffective power-operated means effective during entry of single items and during multiple-item total-taking operations to lock the loose connection so that during the entry of single items and during multiple-item total taking operations the shifting means is controlled by said manipulative devices and manipulative means to determine when the power-operated means is to be effective.

5. In a machine of the class described, the combination of a multiple-item totalizer and a plurality of totalizers arranged in a row; actuators for the totalizers; amount manipulative devices to control the extent of movement of the actuators; means for shifting said row of totalizers relatively to the actuators; a plurality of manipulative devices; a differential mechanism controlled by the manipulative devices; connections actuated by the differential mechanism for controlling said shifting means, said connections including a beam movable with the differential mechanism without actuating the shifting means; means to normally lock said beam so that during the entry of single items and during item total-printing operations the shifting means is controlled by said manipulative devices; a plurality of special manipulative devices; and means actuated under the joint control of said special manipulative devices and the amount manipulative devices for unlocking said beam during the entry of the items of a multiple-item transaction.

6. In a machine of the class described, the combination of a plurality of totalizers and a multiple-item totalizer arranged in a row; means to enter single-item transactions in said totalizers and the items of a multiple-item transaction in said multiple-item totalizer and to take the total of said items from the multiple-item totalizer, including actuators, a plurality of amount keys, a plurality of transaction keys, and a plurality of special keys; a differential mechanism; connections between the differential mechanism and the row of totalizers, including a beam, said connections and differential mechanism actuated as a unit under control of the transaction keys to select a totalizer to receive the amount of a single-item transaction; means settable under the joint control of the amount keys and a special key; a movable device operated by the last-mentioned means for rendering the beam ineffective during the entry of the items of a multiple-item transaction and for actuating certain of said connections to select the multiple-item totalizer to receive the items of said multiple-item transaction; and mechanism operated during a multiple-item total-taking operation for setting the settable means to move the device into a position to render the beam effective to cause the differential mechanism to select a totalizer under control of the transaction key operated at the beginning of the multiple-item transaction.

7. In a machine of the class described, the combination of a plurality of totalizers and a multiple-item totalizer arranged in a row; means to enter the items of a multiple-item transaction in the multiple-item totalizer and to enter each single-item transaction in a selected one of the totalizers; a plurality of transaction keys; a differential mechanism actuated under control of the keys; connections actuated by the differential mechanism for selecting a transaction totalizer to receive the amount of a single-item transaction; a shiftable means having a plurality of devices thereon; a plurality of special keys; and mechanism controlled by the special keys for adjusting the shiftable means for causing one of the devices on said shiftable means to actuate an element of said connections in conjunction with the differential mechanism under control of the transaction keys to select a transaction totalizer and for causing another of said devices on the shiftable means to actuate an element of said connections independently of the differential mechanism to select the multiple-item totalizer.

8. In a machine of the class described, the combination of a plurality of transaction totalizers and a multiple-item totalizer arranged in a row; a plurality of amount keys; a plurality of transaction keys; a plurality of multiple-item keys; actuators for the totalizers; means to control the actuators to enter items of a multiple-item transaction in the multiple-item totalizer and to take the total of said items, and to enter each single-item transaction in a selected one of said totalizers; means for shifting the totalizer row relatively to the actuators to select a totalizer for receiving entries; a differential mechanism actuated under control of the transaction keys; connections normally actuated by the differential mechanism under control of the transaction keys to operate the shifting means to select a transaction totalizer during the entry of single-item transactions; means controlled jointly by the multiple-item keys and the amount keys for actuating certain elements of the connections to operate the shifting means to select the multiple-item totalizer upon joint operation of an amount key and a multiple-item key; and means for restoring said actuating means to normal position during multiple-item total-taking operations to select a transaction totalizer under control of the transaction keys to receive the amount cleared from the multiple-item totalizer.

9. In a machine of the class described, the combination of a multiple-item totalizer and a plurality of transaction totalizers arranged in a row; means for shifting said row of totalizers; a differential mechanism; connections between the differential mechanism and the shifting means for actuating said shifting means; a plurality of manipulative devices; a control shaft; actuating means for said control shaft; means under control of said manipulative devices to cause the shaft to be operated by the actuating means; and means controlled by said shaft for readjusting certain elements of said connections to select said multiple-item totalizer during certain operations, and during other operations to select one of said transaction totalizers.

10. In a machine of the class described, the combination of a multiple-item totalizer and a plurality of transaction totalizers arranged in a row; means for shifting said row of totalizers; a differential mechanism; connections between the differential mechanism and the shifting means for actuating said shifting means; a plurality of sets of manipulative devices; a control shaft; a main operating-means; a plurality of coupling devices between the control shaft and the main operating means; means controlled by said sets of manipulative devices to move the coupling devices into coupling position wherein the main operating means can actuate said control shaft; and means controlled by said shaft for readjusting certain elements of said connections to select said multiple-item totalizer during certain operations, and during other operations to select one of said transaction totalizers.

11. In a machine of the class described, the combination of a multiple-item totalizer and a plurality of transaction totalizers arranged in a row; means for shifting said row of totalizers; a differential mechanism; connections between the differential mechanism and the shifting means for actuating said shifting means; a plurality of sets of manipulative devices; a control shaft; a plurality of power-operated coupling devices normally in uncoupling positions adapted to actuate said control shaft when in coupling positions; means intermediate said sets of manipulative devices and said coupling devices to determine the positions of said coupling devices; and means controlled by said shaft for readjusting certain elements of said connections to select said multiple-item totalizer during certain operations, and during other operations to select one of said transaction totalizers.

12. In a machine of the class described, the combination of a multiple-item totalizer and a plurality of transaction totalizers arranged in a row; means for shifting said row of totalizers; a differential mechanism; connections between the shifting means and the differential for actuating said shifting means to select a totalizer from the row; a plurality of sets of manipulative devices; a control shaft; means controlled by said shaft for adjusting certain elements of said connections to shift the row of totalizers to select said multiple-item totalizer during certain operations, and during other operations to select one of said transaction totalizers; a main operating means; means actuated by the main operating means, including a coupling device, to actuate said control shaft, said coupling device movable into an effective position wherein the control shaft may be actuated thereby, or into an ineffective position wherein the control shaft cannot be actuated thereby; and a plurality of devices actuated by a variable combination of manipulative devices of said sets of manipulative devices to control the effectivity of said coupling device.

13. In a machine of the class described, the combination of a multiple-item totalizer and a plurality of transaction totalizers arranged in a row; means for shifting said row of totalizers for selecting a totalizer from the row; a differential mechanism; connections between the differential mechanism and the shifting means for actuating said shifting means; a plurality of sets of manipulative devices; a control shaft; means controlled by said shaft for adjusting certain elements of said connections to select said multiple-item totalizer during certain operations, and during other operations to select one of said transaction totalizers; a main operating means; oscillating means actuated by the main operating means during each machine operation; a device movable into one position to engage with the oscillating means to actuate said control shaft, said device also movable from the engaged position into another position wherein the device is disengaged from the oscillating means so that the control shaft is not actuated; and means controlled by said manipulative devices to determine the position of the device.

14. In a machine of the class described, the combination of a plurality of transaction totalizers arranged in a row including a multiple-item totalizer; actuators to enter items of a multiple-item transaction in said multiple-item totalizer; a plurality of transaction keys; a differential mechanism controlled by said keys; connections adapted to be adjusted by the transaction differential mechanism to select a totalizer under control of the transaction keys; cam means for readjusting certain elements of the connections for selecting the multiple-item totalizer at the beginning of the first multiple-item transaction entry operation; power-operated means for operating the cam means prior to the entry of the first item of a multiple-item transaction; means to maintain the cam means in the position wherein it maintains said elements in the readjusted position after the multiple-item entry operation; means for controlling the actuators for taking a total of the items of a multiple-item transaction from the multiple-item totalizer; and means rendered effective by the last-named means to cause the power-operated means to restore the readjusted elements of the connections to the first adjusted position during the latter half of the multiple-item total-taking operation to select a transaction totalizer under control of the transaction keys after the multiple-item total has been taken from the multiple-item totalizer, to position the transaction totalizer for receiving said multiple-item total, during the multiple-item total-taking operation.

JULIUS PATZELT.